Figure 1:
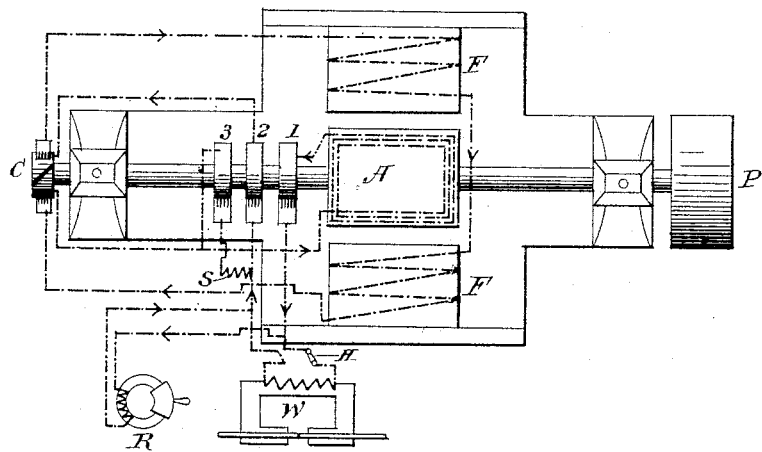

(No Model.) 2 Sheets—Sheet 1.

H. LEMP & L. M. SCHMIDT.
ALTERNATING CURRENT DYNAMO.

No. 444,939. Patented Jan. 20, 1891.

ATTEST:
J. A. Murdle
J. F. Courry

INVENTORS:
Hermann Lemp
Louis M. Schmidt

By H. C. Townsend
Attorney

THE NORRIS PETERS CO., PHOTO-LITHO., WASHINGTON, D. C.

(No Model.) 2 Sheets—Sheet 2.

H. LEMP & L. M. SCHMIDT.
ALTERNATING CURRENT DYNAMO.

No. 444,939. Patented Jan. 20, 1891.

ATTEST:
J. A. Hurdle
J. J. Courry

INVENTORS:
Hermann Lemp
Louis M. Schmidt

By H. C. Townsend
Attorney

UNITED STATES PATENT OFFICE.

HERMANN LEMP AND LOUIS M. SCHMIDT, OF LYNN, MASSACHUSETTS, ASSIGNORS TO THE THOMSON ELECTRIC WELDING COMPANY, OF MAINE.

ALTERNATING-CURRENT DYNAMO.

SPECIFICATION forming part of Letters Patent No. 444,939, dated January 20, 1891.

Application filed September 8, 1890. Serial No. 364,370. (No model.)

*To all whom it may concern:*

Be it known that we, HERMANN LEMP and LOUIS M. SCHMIDT, citizens of the United States, and residents of Lynn, in the county of Essex and State of Massachusetts, have invented a certain new and useful Alternating-Current Dynamo, of which the following is a specification.

Our invention relates to alternating-current dynamo-electric machines designed for use in cases where large or sudden changes of load are likely to occur, and is especially applicable to machines used in the operation of electric welding, wherein the welding-current is supplied from a transformer the primary of which is traversed by alternating currents.

The general object of our invention is to provide an alternating-current machine which shall have the characteristics of what are ordinarily called "compound wound machines"—that is, shall have the proper initial excitation, and while operating to do work shall be excited proportionately with the work to be done in any desired degree.

The special object of our invention is to produce a compound alternating-current dynamo in which the field excitation shall be obtained wholly from a single field-exciting circuit or coil traversed only by current derived from the armature-coil or armature which supplies the work.

Heretofore in compound alternating dynamos it has been proposed to wind the field-magnet with two coils, one traversed by current from a separate machine or armature-coil or by current in a branch of the main circuit. It has also been proposed, as in Patent No. 405,263, to provide a machine with but one field-winding traversed by current from separate armature-coils or from a separate machine working in conjunction with a work-circuit armature-coil. In our invention we use but one field-magnet circuit or coil and but one armature-coil to obtain the desired compounding, the work being traversed, however, by alternating currents.

Our invention consists in the combination, with the armature for the dynamo-machine, of a work-circuit fed with alternating currents from such armature, a field-magnet circuit having a commutator for locally straightening the alternating currents, but in series with the work, and a branch around the work through which the alternating currents pass in the initial excitation of the machine to the commutator for the field-magnet circuit.

Our invention consists, further, in the combination, with an alternating-current dynamo supplying the work with alternating currents from an armature-coil, of a branch in the alternating portion of the circuit around the work, a commutator and field-magnet in series with the work and said branch, and a branch around the field-magnet containing a resistance.

Our invention consists, also, in the special combinations of apparatus hereinafter more fully described, and then specified in the claims.

Figure 2:
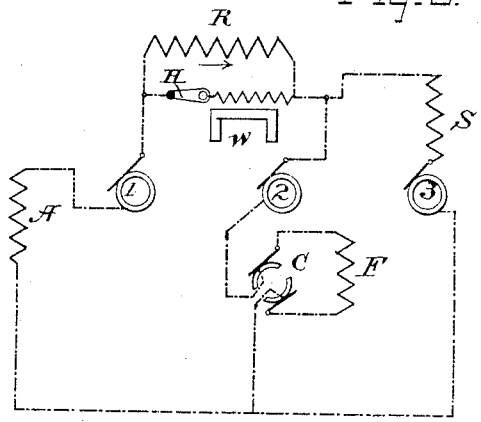
Figure 3:
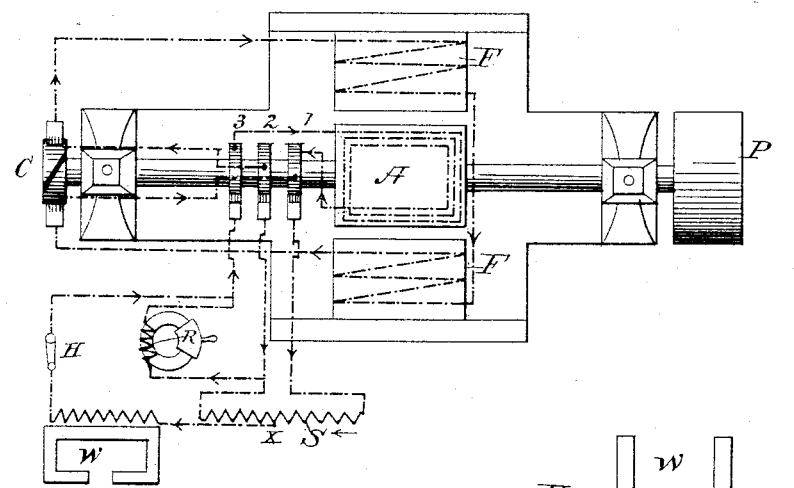
Figure 4:
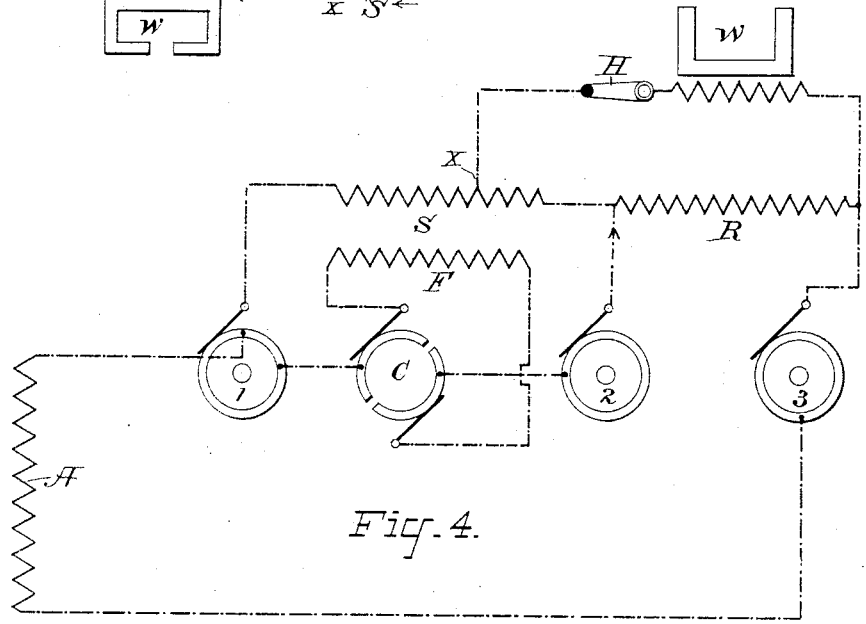

In the accompanying drawings, Figure 1 is a plan in skeleton of a dynamo-machine and circuits combined in accordance with our invention. Fig. 2 is a diagram of the circuits and connections. Fig. 3 is a skeleton plan and diagram of a modification of the invention. Fig. 4 is a simplified diagram of the circuits and connections illustrated in Fig. 3.

Referring to Fig. 1, A is any form or construction of armature wound with a coil or coils, and F is the field-magnet in whose field said armature is rotated. The conducting-rings 1 2 3 are carried by the armature-shaft and have connections to be presently described. Upon these rings bear brushes for conveying current to or from said rings as they rotate.

C typifies any commutator for straightening the alternating currents developed by the armature A. The field-magnet F is wound with a coil for exciting it and may be of any desired or proper construction.

P is the pulley for rotating the armature.

W indicates the work, here typified as an electric converter having a secondary of large cross-section adapted to supply currents of large volume but low electro-motive force to the work for welding, and having a finer wire primary, which is traversed by the alternating electric currents supplied from the armature A. In the circuit with the primary is placed an electric switch H for cutting off the alternating currents from the work at pleasure. One terminal of the work-circuit is connected to the brush bearing upon the ring 1, to which one terminal of the armature joins. The other terminal of the work-circuit leads to the brush bearing upon the ring 2, from which latter connection is made to one side of the commutator C. The brushes of the commutator connect to the field-magnet coil, and after passing through such coil the currents circulate by way of the opposite side of the commutator to the opposite terminal of the armature A, as indicated more fully in the diagram.

R is an artificial resistance placed in the alternating portion of the circuit in series with the commutator and field-magnet and in a branch around the work, such as the welder W, such branch being taken at such points that current may flow in the branch R whether the switch H be closed or open. The resistance R may be of any desired form; but we preferably use a counter-electro-motive-force resistance consisting of a coil wound upon an iron core. This resistance may be made adjustable by means of the device described in patent of Elihu Thomson, No. 397,616, dated February 12, 1889, or by any other desired means.

We preferably employ, in addition to the devices described, a branch or shunt around the field-magnets F. This branch or shunt contains a resistance, (indicated at S,) and may be formed by means of the rotating ring 3, which is provided with a brush to which one terminal of the resistance is connected, while the other terminal is connected to the circuit, as indicated by the diagram. The ring itself, which rotates, connects to the circuit leading to the terminal of the armature to which the field-magnet coil connects directly. It is obvious that the use of the ring 3 might be dispensed with by connecting the resistance directly across the terminals of the field-magnet F, as indicated by the dotted lines in the diagram Fig. 2, in which case all of the current would be commuted. The objection to this would be the necessity of having unnecessarily heavy brushes and commutator-sections to avoid excessive sparking and heating.

The arrows indicate the direction of the current in all parts of the circuit.

When the primary of the welder-circuit is opened by the switch H, or when the resistance encountered by the current in the primary is very large, the alternating currents will flow principally through the branch R, from which they will pass to the commutator, and then, as commuted currents, through the field-magnet F in series with the resistance R, and thence back to the armature. By this means the fields are excited sufficiently to obtain the required voltage. The resistance R may be adjusted, as desired, to determine the initial excitation and voltage. Upon closing the circuit to the work, as by closing the switch H to operate the welding-coil, the alternating current will pass through the work in part, and uniting with that passing through the branch R will flow through the field-magnet coil F as a commuted current. The field is now excited by the current, which flows as an alternating current in the work and responds to the increased demand made upon it. Part of the current which, at the time of initial excitation and also when the machine is doing its work, flows through the branch R, or the work passes by way of the branch, including resistance S, around the field-magnets and back to the armature A. By this resistance S, placed as shown, we effect two objects: First, we avoid the necessity of commuting the whole current, and in the next place by an adjustment of said resistance S we may determine the ratio in which the voltage shall rise with an increase in the load—as, for instance, if we wish to have the potential or voltage increase, instead of remaining constant as the load increases, the resistance S may be made greater, so that a greater proportion of the increased current shall be shunted to the field. In other words, the resistance S may be employed to determine the nature of the compounding action. We do not limit ourselves, however, to employing a resistance S in the branch around the field-magnet, but may dispense with the same, although, as stated, we prefer to use it.

In Figs. 3 and 4 we have illustrated a somewhat different arrangement of the devices, which does not, however, differ in essential principles from that already described. Here the work-circuit is taken off from an intermediate portion of the resistance S, as indicated at the point $x$. This point of connection, as well as the amount of resistance R, may be adjusted for any desired result and then fixed. In the arrangement shown in Figs. 3 and 4 the current from the armature goes first to collector-ring 1, and from the brush thereof passes by way of resistance S, placed in a branch around the field-magnet coil F. The current for exciting the latter passes from the ring 1 to the commutator, through the field-magnet F, and to ring 2, from which it passes, by brush bearing on ring 2, to the continuation of the circuit, and when the welder W is not open-circuited through the resistance R and by brush and ring 3 back to the armature. The portion of the alternating current which flows as commuted current through the commutator C and field-magnet F and then as alternating current by resistance R supplies the initial excitation of the machine. When W is operated by closing the circuit at H, the total resistance of the alternating-current portion of the circuit diminishes, and the difference of potential at the portions of the circuit lying, respectively, at opposite sides of the field-magnet F rises, thus producing an increase of current in the same to increase the excitation. The adjustment of the point of attachment $x$ serves substantially the same purpose as if the total length of the resistance S were adjusted to determine the amount of current that shall be shunted from the field-magnet. It differs, however, from the arrangement shown in Fig. 1, in that the shunting effect of S is greater when the load is on than it is when the load is off.

What we claim as our invention is—

1. The combination, substantially as described, in a dynamo-electric machine, of armature-coils supplying the work-circuit with alternating currents, a field-magnet circuit in series with the work-circuit and the armature-coils supplying the same, a commutator connected to the field for locally straightening the currents which flow on said work-circuit, and a branch around the work-circuit applied as shown, so that the currents flowing therein from the armature-coils supplying the work will flow through the commutator and field-magnet.

2. The combination, substantially as described, in an alternating-current dynamo-machine having its armature connected directly to the work-circuit, so as to supply the same with alternating currents, of a counter-electro-motive-force resistance in a branch taken around the said work-circuit from a point between the work and the armature supplying the same, and a field-magnet coil and commutator therefor in series with the work-circuit and branch around it containing the counter-electro-motive-force resistance.

3. The combination, substantially as described, with a dynamo-electric machine having its armature-coils connected directly to a work-circuit for supplying the same with alternating currents, of an adjustable counter-electro-motive-force resistance in a branch through which currents from said coils may flow around the work, a field-magnet coil in series with the work-circuit and branch around the same, and a commutator between such field-magnet and the work-circuit, as and for the purpose described.

4. The combination, substantially as described, of a dynamo-electric machine having its armature connected directly to a work-circuit, so as to supply the same with alternating currents, a branch around the work-circuit connected to the circuit between the work and the armature and containing a resistance, a field-magnet coil and commutator through which the currents of the work-circuit and the branch around the same flow as commuted currents, and a branch around the field-magnet connected to the circuit between the field-magnet and a portion of the circuit containing the work, as and for the purpose described.

5. The combination of an alternating-current source, a series circuit between the terminals thereof, branched at two points, two of said branches in multiple with one another containing, respectively, the work and an artificial resistance through which the current from the source may flow independently of the work, while the two other branches in multiple with one another contain, respectively, the field-magnet coil for a dynamo producing the alternating currents and an artificial resistance, and a commutator between the field-magnet coil and the portion of the circuit in series therewith in which the alternating currents flow through the work and the branch around the same.

Signed at Lynn, in the county of Essex and State of Massachusetts, this 30th day of August, A. D. 1890.

HERMANN LEMP.
LOUIS M. SCHMIDT.

Witnesses:
JOHN W. GIBBONEY,
ALBERT L. ROHRER.